Dec. 1, 1964 N. LAING 3,159,362
LIFTING AND PROPULSION MEANS FOR AIRCRAFT
Filed May 7, 1963 17 Sheets-Sheet 1

INVENTOR
NIKOLAUS LAING
BY
Pennie Edmonds Morton Taylor and Adams
ATTORNEYS

Dec. 1, 1964   N. LAING   3,159,362
LIFTING AND PROPULSION MEANS FOR AIRCRAFT
Filed May 7, 1963   17 Sheets-Sheet 3

INVENTOR
NIKOLAUS LAING
BY
ATTORNEYS

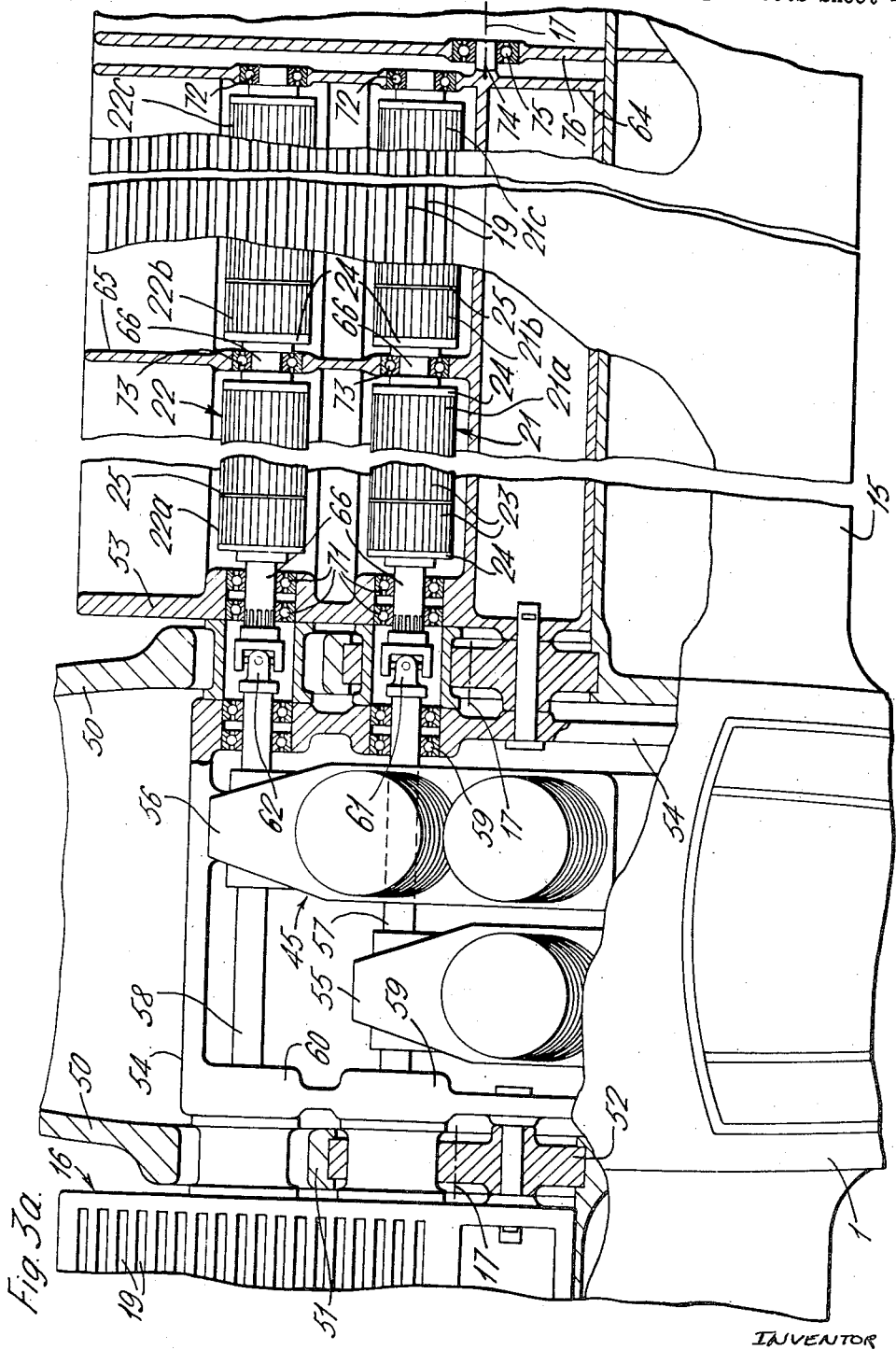

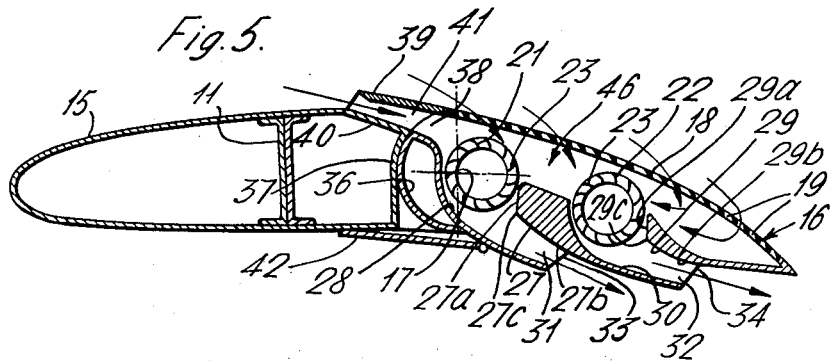
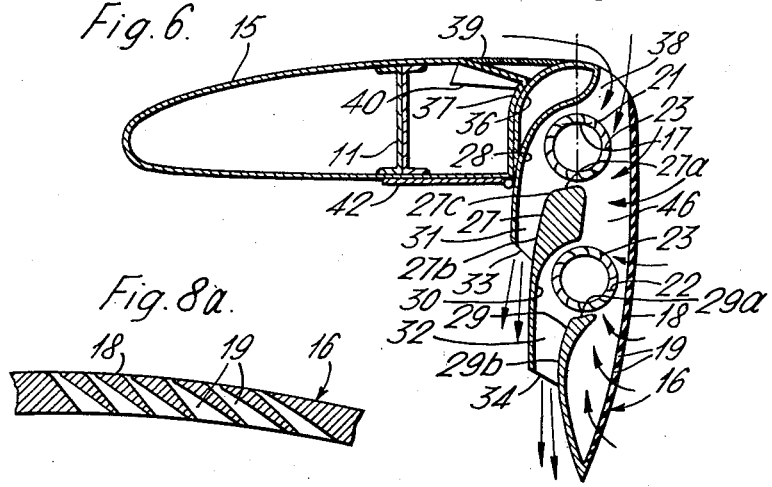
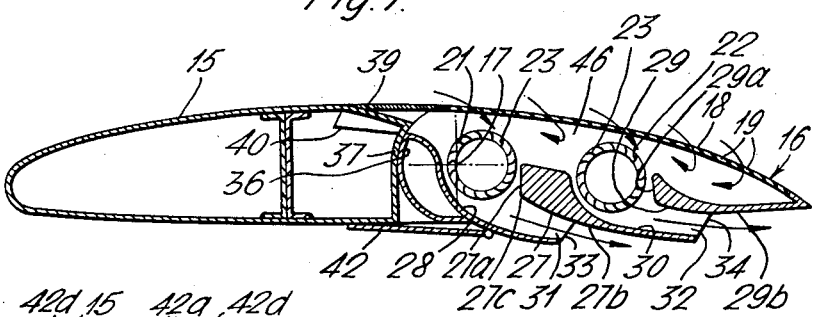

Dec. 1, 1964  N. LAING  3,159,362
LIFTING AND PROPULSION MEANS FOR AIRCRAFT
Filed May 7, 1963  17 Sheets-Sheet 7

INVENTOR
NIKOLAUS LAING
ATTORNEYS

Dec. 1, 1964  N. LAING  3,159,362
LIFTING AND PROPULSION MEANS FOR AIRCRAFT
Filed May 7, 1963  17 Sheets-Sheet 8
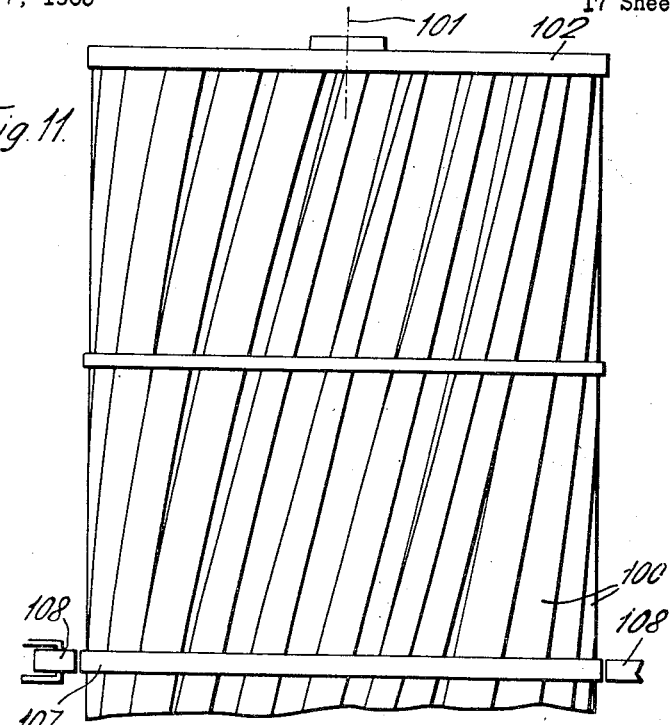
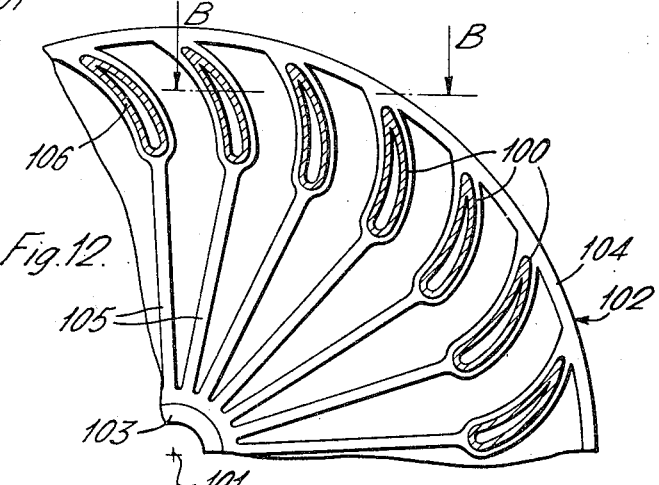
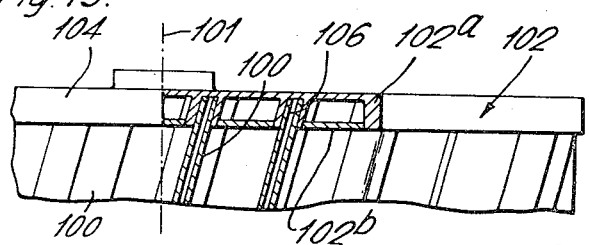
INVENTOR
NIKOLAUS LAING

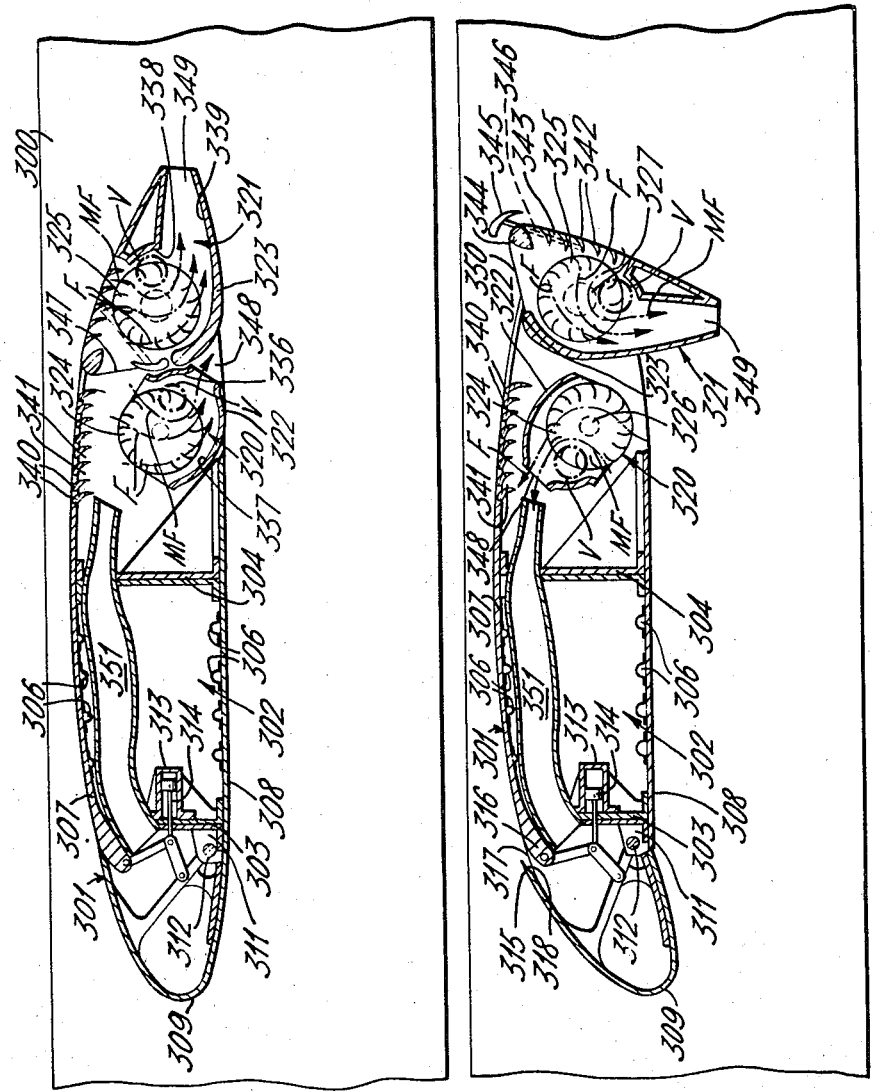

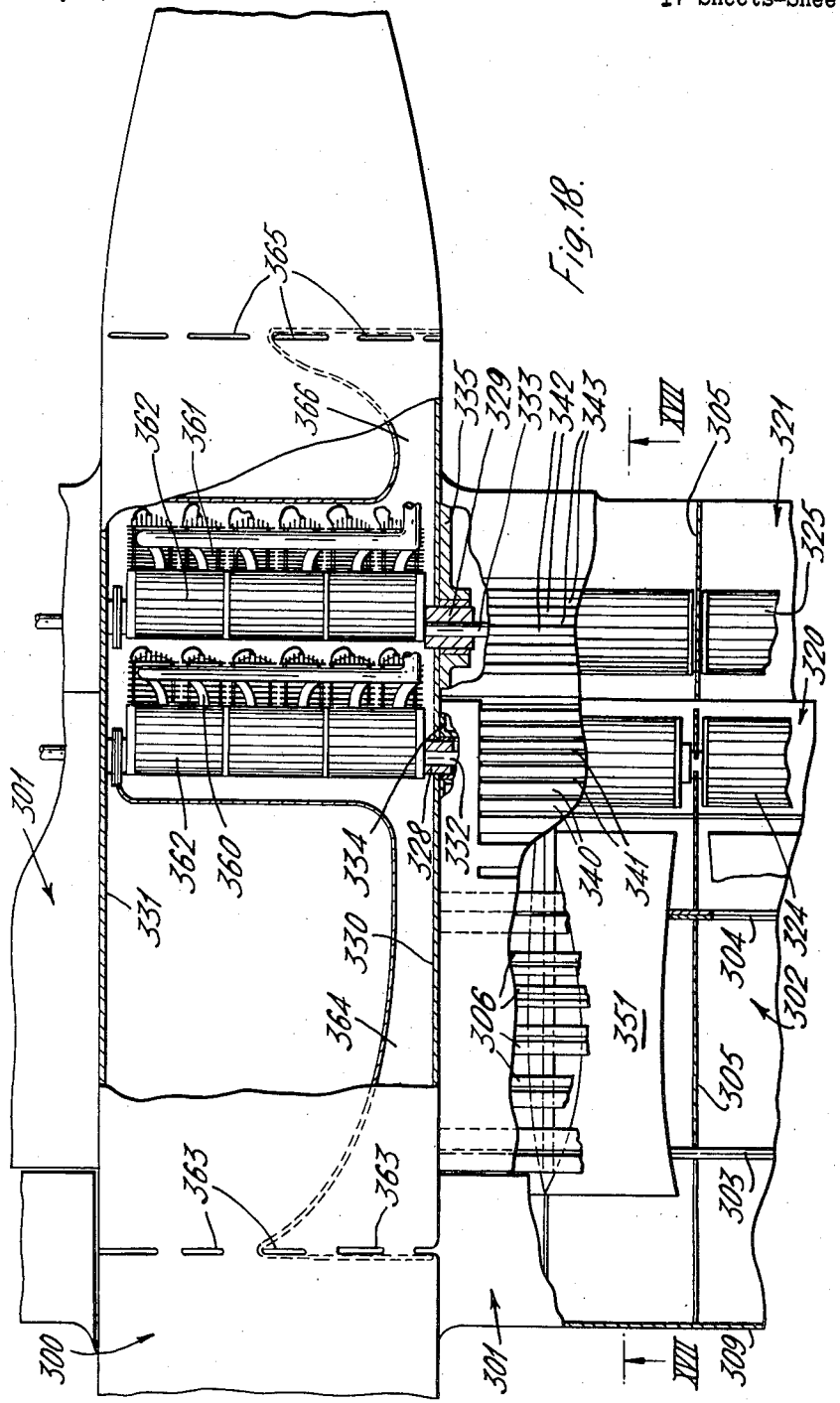

Dec. 1, 1964   N. LAING   3,159,362
LIFTING AND PROPULSION MEANS FOR AIRCRAFT
Filed May 7, 1963   17 Sheets-Sheet 13

INVENTOR
NIKOLAUS LAING
BY
Renroe Edwards Morton Taylor & Adams
ATTORNEYS

Dec. 1, 1964    N. LAING    3,159,362
LIFTING AND PROPULSION MEANS FOR AIRCRAFT
Filed May 7, 1963    17 Sheets-Sheet 14
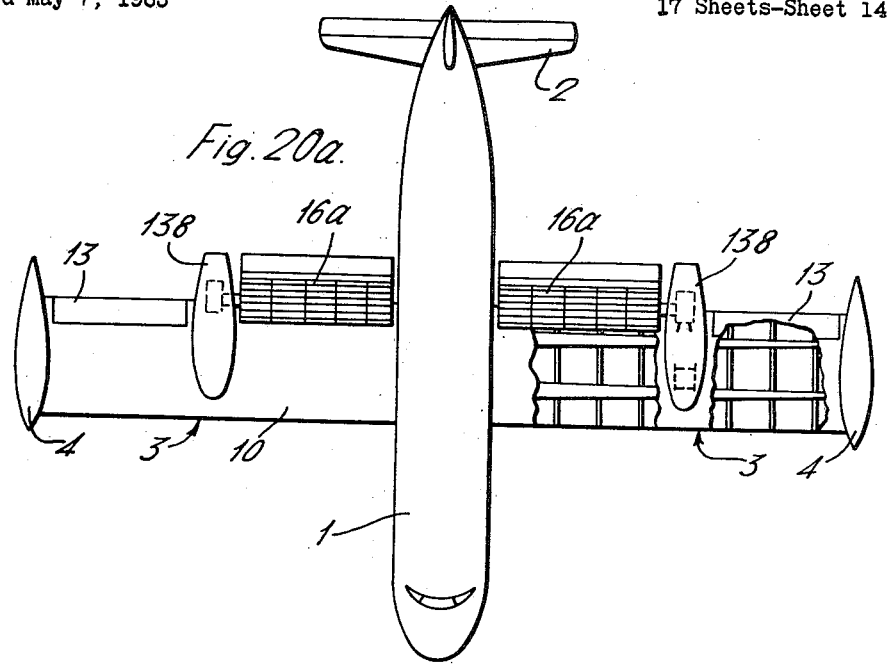
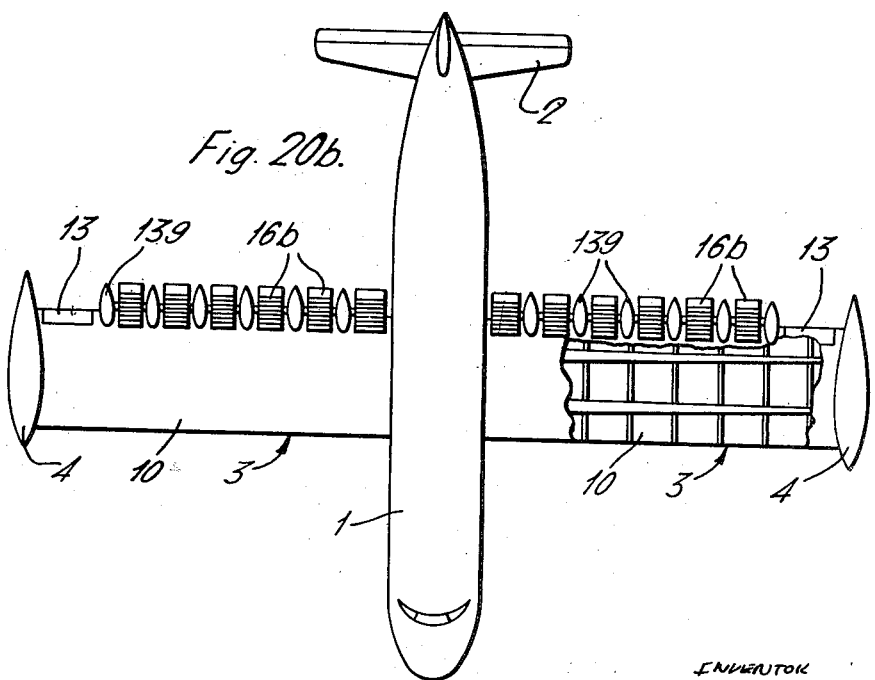
INVENTOR
NIKOLAUS LAING
BY
Pennie Edmonds Morton Taylor & Adams
ATTORNEYS Dec. 1, 1964    N. LAING    3,159,362
LIFTING AND PROPULSION MEANS FOR AIRCRAFT
Filed May 7, 1963    17 Sheets-Sheet 15
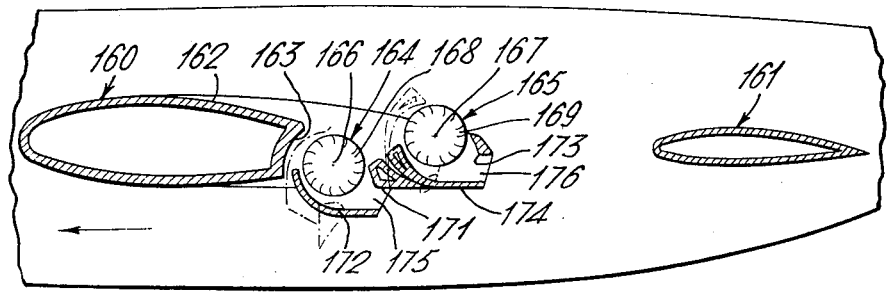
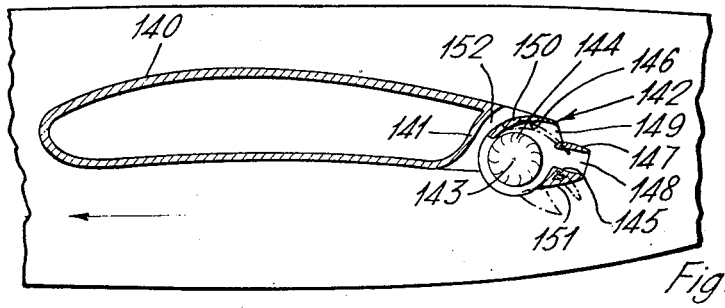
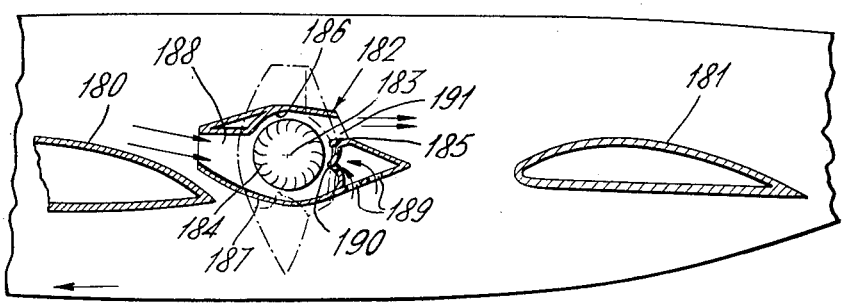
INVENTOR
NIKOLAUS LAING
BY
ATTORNEYS

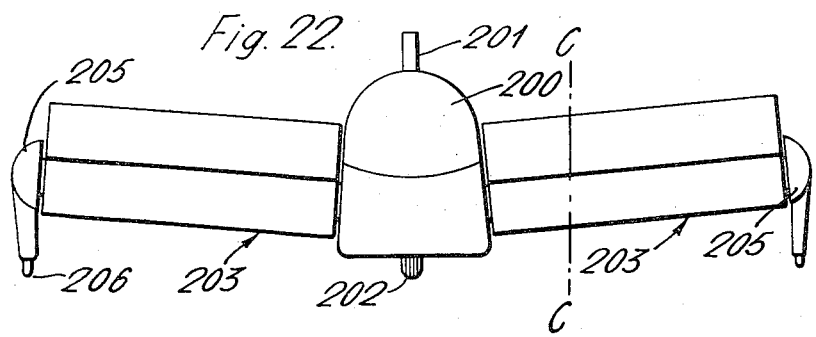
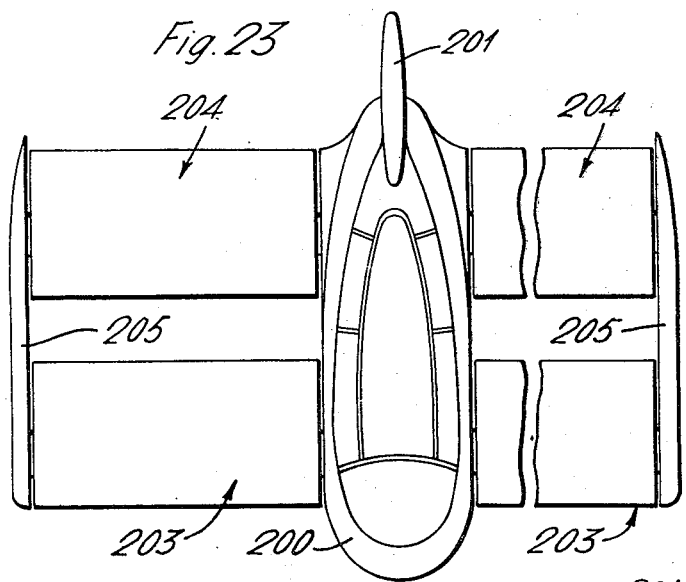
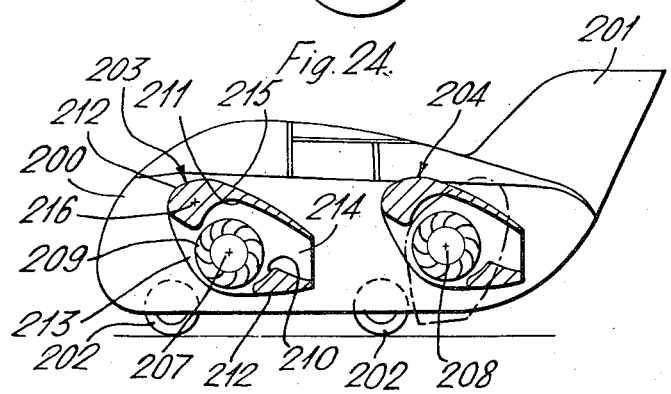

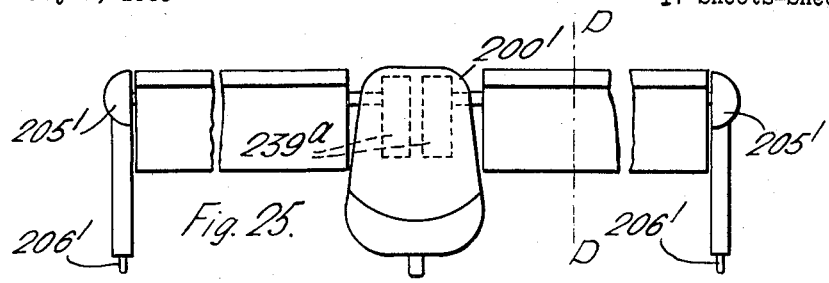
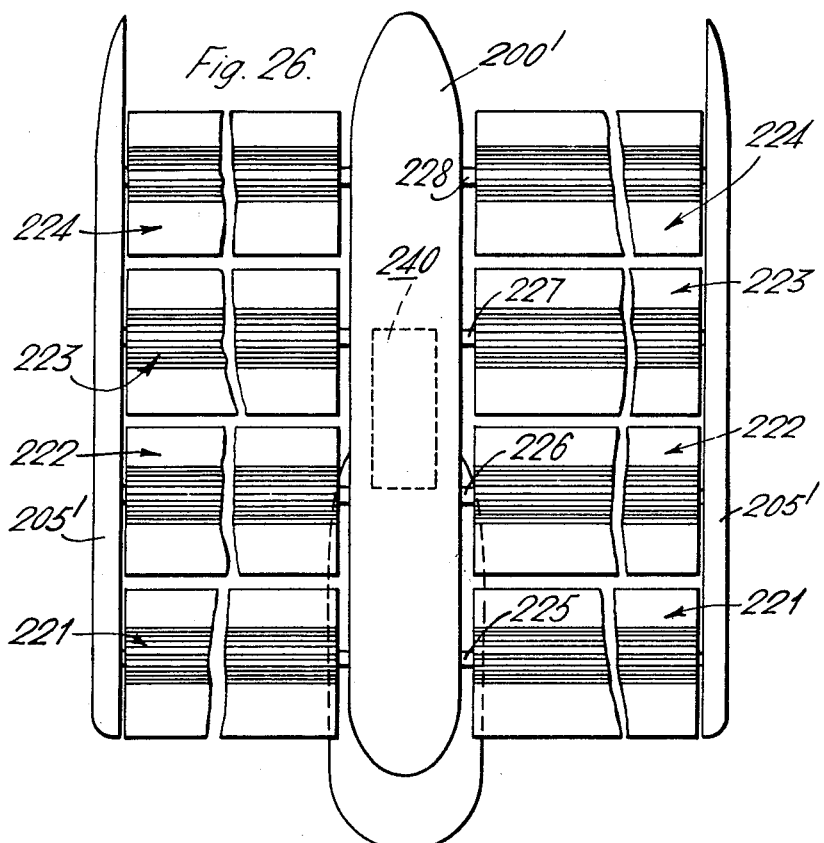
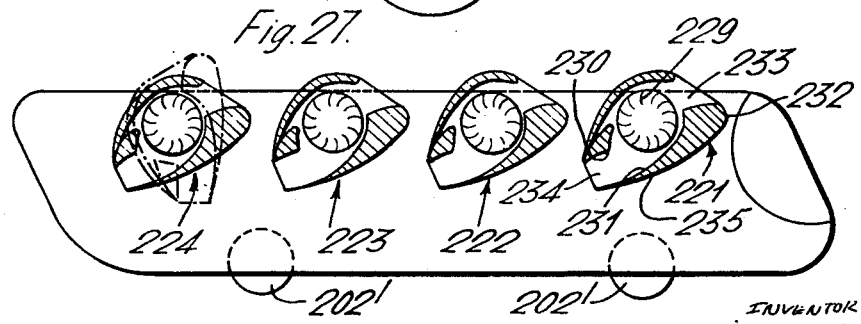

United States Patent Office 3,159,362
Patented Dec. 1, 1964

3,159,362
LIFTING AND PROPULSION MEANS
FOR AIRCRAFT
Nikolaus Laing, Hofener Weg 35, Aldingen, near
Stuttgart, Germany
Filed May 7, 1963, Ser. No. 278,582
Claims priority, application Germany, Apr. 15, 1959,
L 32,978; Apr. 16, 1959, L 32,996
14 Claims. (Cl. 244—12)

This invention relates to aircraft, and this application is a continuation-in-part of my copending application No. 22,223, filed April 14, 1960, now abandoned.

In its broadest aspect the invention provides an aircraft having a power source and at least a pair of blower units symmetrically arranged about the longitudinal axis of said aircraft, each said unit comprising a cylindrical bladed rotor driven by the power source and a casing for said rotor providing guide walls to guide air twice through the path of the rotating blades of the rotor and an air inlet and an air outlet, the rotor being mounted with its axis extending substantially in a direction transverse to the direction of intended movement of the aircraft, and the casing being angularly movable between a first position in which air is ejected from the housing outlet and in a predominantly downward direction and a second position in which air is ejected from the housing outlet in a predominantly rearward direction. The blower units can be designed to provide all the propulsive force required for the aircraft, as is preferred, or they may be supplemented by conventional propulsive means. The aircraft can be designed for vertical- or short-take off.

The blower units can take various forms. In one preferred form the casing is designed as a flap in combination with a fixed wing portion of more or less conventional profile. While this is an economical way of employing the power input to the rotors, it involves additional measures to ensure that the centre of pressure is maintained in a vertical line with the centre of gravity as the flap is pivoted. Various such measures are discussed herein. Thus, in a preferred form of aircraft according to the invention, the flaps form a unit with the power source which unit pivots as a whole; the power source is arranged so that as it pivots its centre of gravity moves longitudinally and moves the centre of gravity of the aircraft as a whole into vertical alignment with the centre of pressure. Alternatively the wing can include one or more portions which can move forwards and backwards when the flap pivots: in this arrangement the engine or engines can be fixed in the fuselage. In another preferred embodiment of the invention, means are provided to blow air over the leading part of the upper wing surface when the flap is lowered, so as to increase the lift of the wing near its leading edge and thus counterbalance the increased lift at its trailing edge due to the flap. Once again, the centre of pressure remains in the same vertical line as the centre of gravity, and there is no need to move the engine(s). Still another method of maintaining vertical alignment between the centres of pressure and gravity is to provide an auxiliary wing in tandem with a main wing having the flap at its trailing edge so that in one position it blows air over the auxiliary wing to increase its lift while when the flap is pivoted to its other position it no longer blows air over the auxiliary wing and the increased lift thereof ceases.

In a further form of aircraft according to the invention, fixed wing portions are dispensed with and the blower units are arranged in longitudinally spaced pairs and controlled synchronously.

In all cases the rotor and guide walls are such as to co-operate to stabilize a vortex of Rankine type interpenetrating the blades adjacent the said guide wall and guiding air through the rotor in a strongly curved path.

Further features and advantages of the invention will appear from the following description of various embodiments thereof given by way of example only with reference to the accompanying drawings in which:

FIGURE 3a is an enlarged plan view of the central part of the aircraft with parts cut-away to show interior portions some of which are sectioned;

FIGURE 3b is a scrap section showing the connection of a rotor to a shaft;

FIGURE 4 is an elevation of a power unit for the FIGURE 1 aircraft as seen looking transversely of its longitudinal axis;

FIGURES 5, 6 and 7 are cross-sections on the line A—A of FIGURE 3 showing the wing with the flaps in take-off, landing and normal flight conditions respectively;

FIGURES 8a and 8b are enlarged cross-sectional views of two different portions of the wing;

FIGURE 11 is a side elevation of a rotor such as may be incorporated in the FIGURE 1 aircraft;

FIGURE 12 is a partial transverse section of the FIGURE 11 rotor;

FIGURE 13 is a partial elevation and scrap section of the FIGURE 11 rotor, the section being taken on the line B—B in FIGURE 11;

FIGURES 15a and 15b are respectively a sectional plan view and a vertical section of the inner portion of the wing of FIGURES 14a and 14b showing also adjacent parts of the fuselage, the section lines being shown at XVA—XVA and XVB—XVB in FIGURE 14a;

Figure 14A:
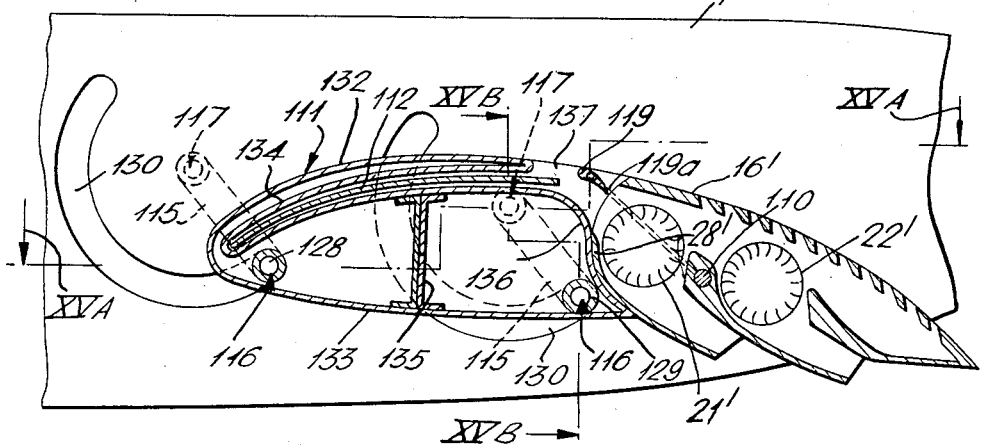
FIGURES 14a and 14b are vertical sections of the wing of a second preferred form of aircraft embodying the invention, the figures showing parts of the wing in take-off and landing positions, respectively.
Figure 14B:
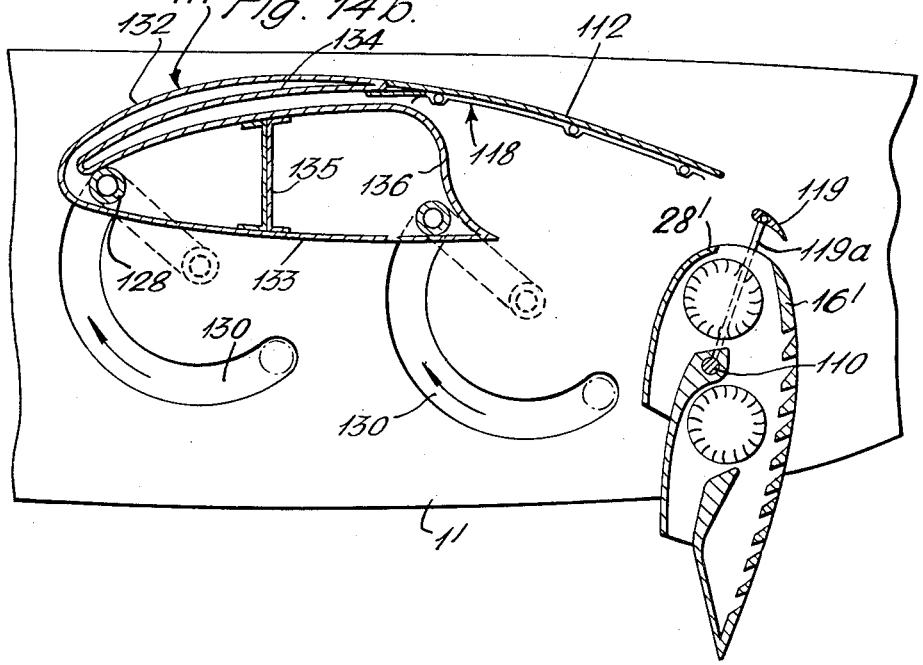
Figure 16A:
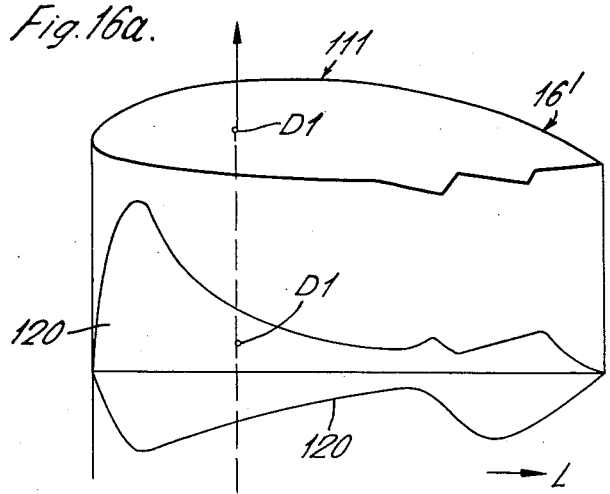
Figure 16B:
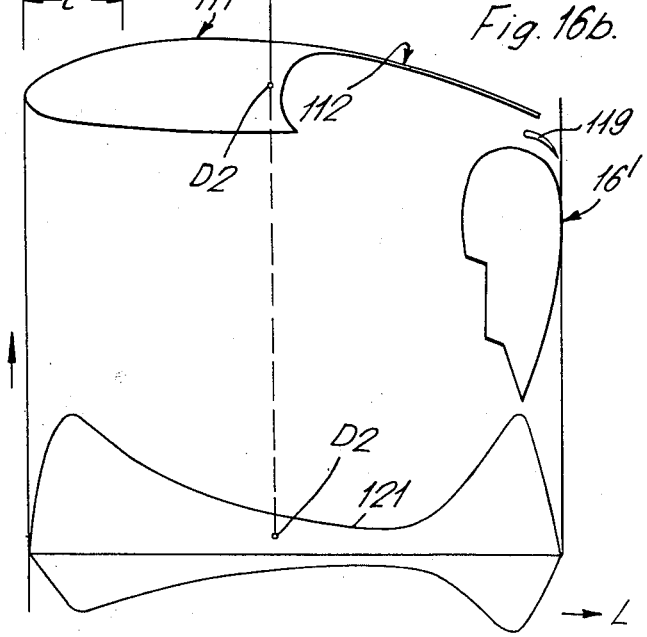
Figure 19A:
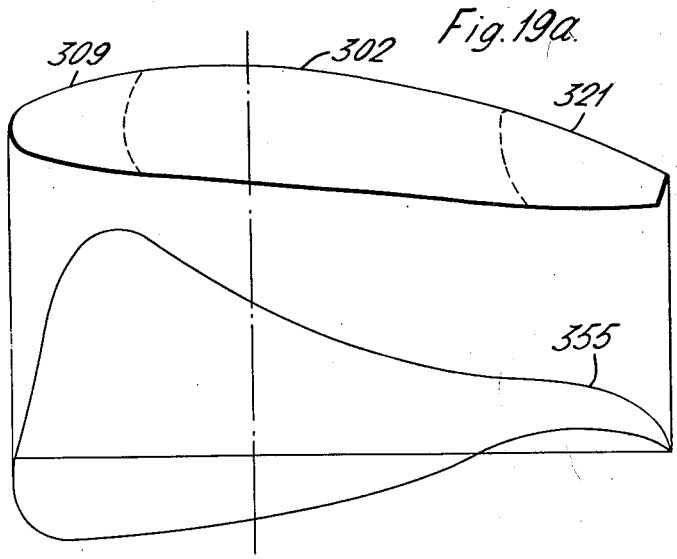
Figure 19B:
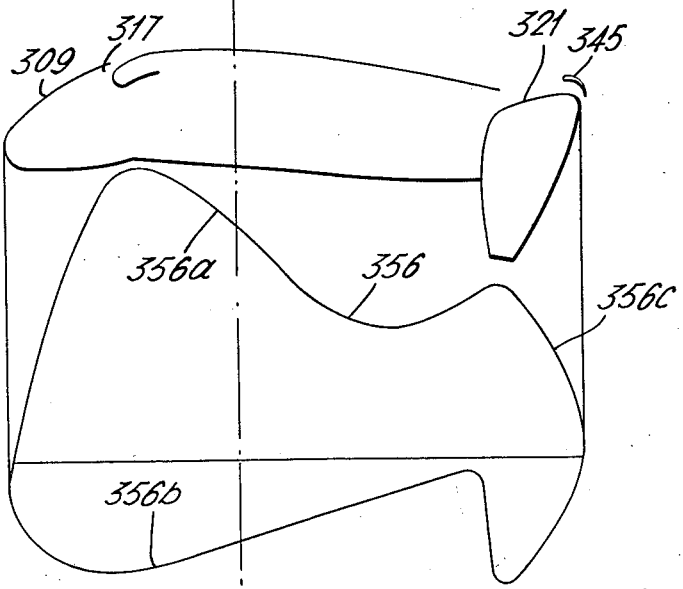

FIGURES 16a or 16b shows diagrams showing lift on the wing of FIGURES 14a and b and 15a and b, during normal flight and landing, respectively;

FIGURES 17a and 17b are vertical sections of the wing of a third preferred form of aircraft embodying the invention;

FIGURE 18 is a plan view of a central portion of the third form of aircraft, with the fuselage and certain wing parts shown broken away and sectioned, and showing the section planes of FIGURES 17a and 17b at XVII—XVII;

FIGURES 19a and 19b are diagrams showing lift on the wing of the third form of aircraft shown in FIGURES 17a, 17b and 18, during normal flight and landing, respectively;

FIGURES 20a and 20b are diagrammatic plan views of two different aircraft showing possible modifications of the aircraft of FIGURES 1 to 10;

FIGURE 21a is a diagrammatic cross-section of a wing employing a blower unit;

FIGURES 21b and 21c are diagrammatic cross-sections showing two tandem wing constructions having blower units;

FIGURES 22, 23 and 24 illustrate schematically a tandem wing aircraft where the wings themselves are blower units, FIGURE 22 being a front elevation, FIGURE 23 a plan view, and FIGURE 24 a section on the line C—C of FIGURE 22, and FIGURES 25, 26 and 27 are views similar to FIGURES 22 to 24 (except that the section line is designated D—D) of an aircraft somewhat similar to that of the last group of figures but employing four wings.

Referring to the drawings the light aircraft of FIGURES 1 to 12 includes a central fuselage 1, a tail unit 2 and a pair of cantilevered wings designated generally 3 the tips of which carry tank units 4 of streamline shape. When on the ground the aircraft is supported on a pair of non-retractable wheels 5, 6 spaced along the longitudinal axis and fairing into the lower part of the fuselage, and a pair of wheels 7 each supported from one tank unit 4. The wheels 7 are supported on arms 8 pivoted in the forward part of the respective tank units and angularly movable between an aircraft-supporting position (not shown) and a retracted position wherein wheels 7 and arms 8 are substantially enclosed in the tank units.

Each wing 3 includes a fixed portion 10 extending between the fuselage 1 and the respective tank unit 4 and including a main spar 11 forming the main structural member of the wings. The tip portions 12 of the wings 3 are of conventional formation and carry ailerons 13 at their trailing edges. The inner portions 14 of the wings 3, which amount to some two-thirds of their total length, each comprising a fixed leading part 15 which contains the main spar 11 and is similar in section to a conventional aircraft wing over about the leading half of the chord of such wing, and, a flap 16 which is supported (as will be described) for angular movement about an axis indicated at 17 which runs along the length of the wing, the flap 16 approximating in section to a conventional aircraft wing over the trailing half of the chord of such wing.

Each flap 16 has an upper wall 18 of appreciable thickness which is formed over its entire area with air inlet slots 19 running along the length of the wing, as best seen in FIGURE 8a. The slots 19, seen in section taken transversely of the wing, are narrow at the outer surface of the wall 18 and increase in width going towards the interior of the flap 16 so as to act as diffusers: the slots are angled so that in entering the slots air is deflected only by a small angle (of the order of 30°). In the interior of each flap is mounted a pair of cylindrical bladed rotors 21, 22 running the length of the flap and supported for rotation about their axes (as will be described). The rotors 21, 22 each comprise a series of curved blades 23 arranged in a ring about the axis and running parallel thereto between supporting end discs 24, reinforcing discs or rings 25 supporting the blades at intervals along their length. The blades 23 have their outer edges leading their inner edges in the direction of rotor rotation shown by the arrow 26, these edges tracing out outer and inner coaxial cylindrical envelopes. The rotors 21, 22 are each associated with generally similar guide means running the length of the rotor in well-spaced relation thereto and guiding flow twice through the blades of the rotor along planes perpendicular to the rotor axis; the guide means for the rotor 21 consist of walls 27, 28 and the guide means for the rotor 22 consist of walls 29 and 30. One wall 27, 29 of each pair includes a portion 27a, 29a converging with the respective rotor 21, 22 in the direction of rotor rotation and a portion 27b, 29b which leads away from the rotor, these wall portions meeting respectively in a rounded nose 27c, 29c. The other wall 28, 30 of each pair diverges steadily from the respective rotor 21, 22 from a line of nearest approach roughly diametrally opposite that of the corresponding wall portion 27a, 29a, and defined with the corresponding wall portion 27b, 29b a converging duct 31, 32 leading to an outlet 33, 34, respectively, both outlets being situated on the underside of the flap 16 to eject air thereover more or less parallel to chord of the flap. The underside of the flap is in fact formed by a continuation of the wall 29b, over which air is ejected from the rotor 22, a continuation of the wall 27b, over which air is ejected from the rotor 21, and the outward-facing surface of wall 28.

On the inlet side of the leading rotor 21 the guide wall 28 therefor curves towards and joins a generally semi-cylindrical front wall 36 of the flap 16 which abuts, and on pivoting of the flap slides over, a similarly formed rear wall 37 closing off the fixed wing part 15, the junction of walls 36 and 37 being spaced from the upper flap wall 18 at the leading end thereof, to define a gap 38. Adjacent this gap 38 the fixed wing part 15 mounts a wall 39, capable of angular movement by a few degrees between a position shown in FIGURES 6 and 7 where it is continuous with the remainder of the upper surface of the wing part 15 and a position shown in FIGURE 5 where it co-operates with a fixed wall 40 in the interior of the wing part 15 leading from the upper surface thereof at a slight angle down to the top of the rear wall 37 of that part so that the walls 39 and 40 form a divergent auxiliary inlet duct 41 extending over the length of the flap.

A plate 42 pivoted to the underside of the flap 16 provides a fairing over any gap which would otherwise appear between the fixed wing part 15 and the flap, on the underside. FIGURE 8b shows how the flap is guided. A pair of rollers 42a are rotatably mounted on a bracket 42b fixed on the upper face of the plate 42 and roll on a track 42c formed by a pair of Z-section members 42d secured on the lower side of the wing part 15. The members 42d are spaced to accommodate the bracket 42b, and are arranged so that the front end of the plate 42 always lies close against the wing part 15.

The rotors 21, 22 of both flaps 16 are driven by a power unit designated generally 45 arranged to move angularly with the flaps about the axis 17, flaps and power unit being connected to move as one assembly. The mounting and driving of the rotor will be described later.

The operation of the aircraft, as so far described, will now be discussed with particular reference to FIGURES 5 to 9: the diagram of FIGURE 9 consists of three parts, an upper part where the normal-flight profile of the wing is shown in full lines and the landing position of the flap 16 is shown chain-dotted, a middle part which is a graph of pressure distribution over the wing chord in the normal-flight position of the wing, and a lower part which is a graph similar to the middle part of the diagram but showing the pressure distribution with the flap in its landing position, the three parts of the diagram being in vertical alignment on the paper.

In normal flight the flap 16 is positioned as shown in FIGURE 7 to have its chord collinear with that of the fixed wing part 15, the upper and lower surfaces of part 15 and flap 16 fairing into one another so that the whole presents a section approximating to that of a normal wing. Some of the air flowing over the upper surface of wing part 15 and flap 16 enters the interior of the flap 16, designated 46, through the slots 19 in the upper flap wall 18. Because of their divergent shape these slots 19 slow down the air flowing through them and increase its pressure. The rotors 21, 22 receive air from the region 46 and deliver it into the ducts 31, 32 at greatly increased velocity, though with little or no increase of pressure over that prevailing in space 46. The ducts 31, 32, being convergent, drop the pressure to that prevailing outside the wing and still further increase the velocity of the air. Consequently a large and rapid air flow is ejected rearwardly from outlets 33, 34 over the underside of the flap and produces a forward thrust on the aircraft which is alone sufficient for its propulsion. The lift of the wing, shown at 47 in FIGURE 9, approximates to that of a conventional wing but is somewhat improved towards the trailing edge due to the shape of the underside and the boundary layer control provided by the removal of air over the flap wall 18. The centre of pressure is shown at $A_1$.

At take-off air will have relatively low velocity over the wing and, if the flap 16 were left in the FIGURE 7 condition, the slots 19 would provide an inadequate cross-sectional area for flow. The flap 16 is therefore pivoted down by a few degrees and the wall 39 lifted as shown in FIGURE 5, to provide the auxiliary inlet duct 41 in alignment with the gap 38 leading to the flap interior 46. This greatly increases the air intake; air entering through duct 41 will undergo a pressure increase by reason of the divergence of that duct, and the performance of the flap and blowers will approximate to that at normal flight. Air ejected from the outlets 33, 34 now has a slight vertical component: the distribution of lift on the wing as forward speed increases will approximate to that of normal flight.

At landing the flap 16 is pivoted down as shown in FIGURE 6, so that the gap 38 becomes uncovered to allow more air to enter the flap interior 46 than could otherwise get through the slots 19 under these conditions. Thus air is drawn into the gap 38 over the upper surface of the fixed wing part 15 and helps to control flow conditions thereover. Air also enters through the slots 19 with the effect of improving the lift on the flap. Air ejected from the outlets produces a vertical thrust, and the lift distribution on the wing is now as shown at 48 in FIGURE 9, such that a great portion of the total lift is applied to the flap. It will be seen that, provided the aircraft is in the correct attitude for landing, conditions are ideal for low-speed landing with greatly lessened danger of stall.

The centre of pressure in the wing in the landing position of the flap is shown at $B_1$, and will be seen to be well rearward of the centre of pressure $A_2$ in normal flight. Compensation is provided by shifting the centre of gravity of the aircraft as a whole, by movement of the power unit which provides an important fraction of the total mass of the aircraft. It will be remembered that the power unit 45 and flaps 16 move as one whole about the axis 17: the centre of gravity of the power unit 45 is shown at $C_1$ in FIGURE 1 for the normal flight position of the flap and at $C_2$ for the landing position thereof. To get the maximum rearward travel of the centre of gravity on lowering of the flaps, the line joining $C_1$ to the axis 17 is inclined forwardly at 45° to the horizontal, for an approximately 90° flap movement.

Figure 10:
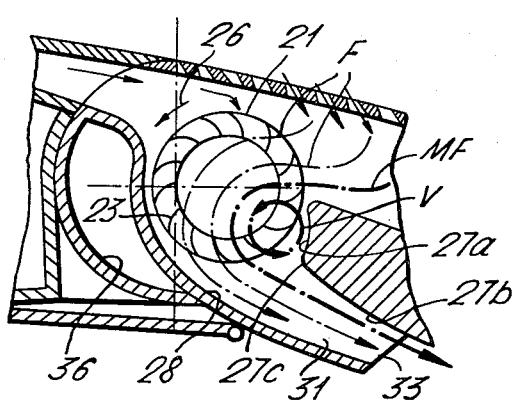
FIGURE 10 is an enlarged portion of the FIGURE 5 section, illustrating the operation of blowers forming part of the aircraft.

Each rotor 21, 22 and respective guide walls 27, 28 and 29, 30 forms a cross-flow blower of novel type, the construction and operation of which is more fully explained with reference to FIGURE 10 which shows the blower 21–27–28 on an enlarged scale: operation of the other blower is of course similar. On rotation of the rotor 21 in the direction of the arrow 26 the rotor blades and guide wall portion 27a co-operate to set up a stable vortex of Rankine type having an eccentric core indicated at V which is roughly cylindrical, and which interpenetrates the blade ring adjacent the wall portion 27a. Flow in the core is circulatory, with a velocity which is greatest at the core periphery. Flow outside the core V is guided thereby along paths more or less concentric with the core as shown by the flow lines F, MF, the flow lines having diminishing velocity going radially outward of the core. Thus the greatest velocity, is associated with the flow line MF immediately adjacent the core V, and design is centred on getting this flow line through the rotor with the minimum loss since any sacrifice of efficiency in the blower flow lines is more than compensated by the greater flow rate in the line MF. It is to be observed that flow through the rotor is turned through an angle approaching 180° and that operation in no way depends on having a wall closely overlying the rotor to prevent return flow; as mentioned, an appreciable spacing of both guide walls 27 and 28 at the lines of nearest approach is advantageous.

Details relating to the mounting of the flaps 16, rotors 21, 22 and power unit 45 will now be described with reference to FIGURE 3a. Main longitudinal members of the fuselage, shown at 50, are thickened at 51 to provide bearings which are aligned on the axis 17 and carry stout discs 52 each secured on one side to a robust end closure wall 53 of the adjacent flap 16 and to a frame 54 located within the fuselage 1 and mounting the power unit 45. Power unit 45 and flaps 16 are thus interconnected for movement as a unit about the axis 17, as previously mentioned. The power unit 45 comprises similar independent "flat" four-cylinder engines 55, 56 arranged side by side with their cylinder axes in spaced vertical planes running longitudinally of the aircraft. Each engine 55, 56 drives through bevel gearing a shaft 57, 58 which runs transversely of the aircraft and is supported in bearings 59, 60 in the frame 54, the shafts 57, 58 being aligned with rotors 21, 22 and driving them through universal couplings 61, 62.

The rotors 21, 22 are each subdivided lengthwise into three sections 21a, 21b, 21c and 22a, 22b, 22c each of which sections is mounted between walls running transversely of the length of the flap 16, and consisting of the previously mentioned closure wall 53 at the fuselage end of the flap, the closure wall 64 at the other end thereof, and intermediate walls 65. The end discs 24 of each rotor section 21a, 21b, 21c, 22a, 22b, 22c are mounted on shafts 66 as shown in FIGURE 3b. A self-aligning bearing 67 mounted within a cup 68 formed on the exterior of each disc 24 carries the end of the shaft 66, which is reduced in diameter. A slotted plate 68a engages flats on the shaft 66 so as to rotate therewith, and the plate 68a is spaced from the end disc 24 by rubber bushings 69 and secured thereto by rivets 70 passing through the bushings. Thus the plate 68a, bushings 69, rivets 70 transmit drive between the shaft 66 and end disc 24 while permitting limited universal movement therebetween. The shafts 66 of rotor sections 21a, 22a nearest the fuselage 1 are mounted in the flap end closure wall 53 by pairs of ball bearings 71 and are driven by the previously mentioned couplings 61 and 62. The shafts 66 of rotor sections 21c, 22c remote from the fuselage are mounted in bearings 72 in the flap end closure wall 64. The shafts 66 interconnecting the rotor sections are mounted in bearings 73 in the intermediate walls 65.

The end closure wall 64 of each flap carries a stub 74 mounted in a bearing 75 in a transverse member 76 of the fixed wing portion 10.

It will be appreciated that neither the main spar 11 and transverse members 76, nor the flap 16, are not completely rigid; the subdivision of the rotors 21, 22 into sections flexibly mounted on the shafts 66 takes account of any bending of such members due to the loads imposed thereon in service of the aircraft.

It will also be appreciated that the arrangement described provides a twin-engine aircraft which operates symmetrically after failure of one engine, which is an advantage that cannot be obtained in a conventional twin-engine aircraft. In the event of failure of one engine the affected rotor imposes very little drag.

While it is possible for the rotors of the aircraft shown in FIGURES 1–10 to have blades extending parallel to the axis, and such blades have been shown for ease of illustration, a helical disposition of the blades is preferred such as disclosed with reference to FIGURES 11 to 13. It will be appreciated that the rotors will be subject to appreciable torques, especially near their point of connection to the drive, and helical blades are better able to resist such torque with minimum distortion. Referring more particularly to FIGURES 11 to 13, the rotor there shown comprises a series of hollow profiled blades 100 running helically about an axis indicated at 101 with a helix angle of some 15°, the blades being mounted between similar end supports one of which is shown at 102. This end support 102 comprises an integral shell 102a including a hub 103 to be secured to a drive shaft (not illustrated) in a manner such as shown in FIGURE 3a, a ring 104 and a series of spokes 105 equal in number to the blades and running from the hub to the ring, each spoke being formed just within the ring 104 to provide a socket 106 snugly receiving and seating one end of each blade. The end support 102 further comprises an inner reinforcing ring 102b interfitting with the sockets 106 and ring 104. The rotor is reinforced at intervals along its length with rings 107, which may be plain flat rings apertured for snug passage therethrough of the blades. At intervals over the length of the rotor there are mounted groups of three small rollers 108 rotatable on axes fixed to the flap 16 (not shown in FIGURES 11 to 13) in alignment with a cylindrical ring 109 fixed to and surrounding the rotor blades, but slightly spaced therefrom. These rollers 108 are normally inoperative but come into play in the event of excessive vibration as when running the rotor through a resonant speed.

The rotor shown in FIGURES 11 to 13 can be used in any of the embodiments of the invention herein described.

The rotor blades 100 are preferably made of titanium tubing, but can alternatively be made of plated aluminium alloy or alloy steel. The end support 102 preferably has its shell 102a comprising hub 103, ring 104, spokes 105 and sockets 106, cast integrally of titanium or magnesium alloy, the reinforcing ring 102b being cast in similar material. Bonding of the shell 102a, ring 102b and blades 100 is affected by techniques appropriate to the metals used and known by those skilled in the art. Alternative materials for the rotors include plastics materials reinforced by prestressed plain fibre.

In designing the rotors for use in aircraft according to the invention it is to be borne in mind that the rotors will normally be run at speeds substantially above resonance frequency so that lightness, strength and balance are of prime importance.

FIGURES 14a, 14b, 15a, 15b and 16 illustrate a second preferred form of aircraft differing from the aircraft of FIGURES 1 to 10 chiefly in that relative movement between the flap and the remainder of the wing is arranged for in a different way to enable adjustment of the centre of pressure to the centre of gravity of the aircraft without by prestressed plain fibre.

In the aircraft of FIGURES 14a to 16, the flap 16" itself is generally similar to the flap 16 previously described; the parts of the flap 16 will be designated with the same numerals as have been used for similar parts in previous figures, except that they will be distinguished by primes, and no further description of these parts will be needed. In addition other parts of the second form of aircraft are generally similar to those of the first aircraft, and for what is not specifically shown in FIGURES 14a to 16 reference should be made to the earlier figures.

The flap 16' is mounted for rotation as a whole on a stout pivot shaft 110 fixed to the fuselage (though shown as a rod it is preferably tubular and may be of larger diameter than illustrated). The rotors 21', 22' which in this embodiment are identical in diameter, are equidistant from the shaft 110 and may be driven by a single drive shaft coaxial with the shaft 110, through gear trains, the drive shaft being itself driven by a single engine fixed in the fuselage.

The aircraft of FIGURES 14a to 16 has no fixed wing part but has two movable wing members 111, 112 which are operated in unison when the flap is lowered or raised. The leading movable wing member 111 provides upper and lower wing surfaces corresponding to the leading half of a conventional wing. The intermediate movable wing member 112 provides an upper surface similar to that of the trailing half of a conventional wing. The leading wing member 111 is supported on a linkage comprising two equal arms 115, articulated to said member at 116 and rotatable about pivots which are designated generally 117 and fixed with respect to the fuselage. The intermediate wing member 112 is supported on the leading wing member 111 and movable relative thereto on a roller track indicated generally 118 in FIGURE 14b, and operating in a manner known in the art in connection with the operating mechanisms of Fowler flaps. An additional wing member in the form of a small guide vane 119 is supported on flap 16' by means of arms 119a projecting therefrom, and is guided by means not shown for angular movement relative to the arms so as to adopt the positions illustrated.

In the normal flight position of the wing members 111, 112 and flap 16' the intermediate member 112 lies within the member 111, and the latter co-operates with the flap to present a section generally similar to that of a conventional wing.

In the take-off position of the wing members 111, 112 and flap 16', which is illustrated in FIGURE 14a, the flap is lowered by some 15° with respect to the normal flight position thereof, in the same general manner and for the same purpose as explained with reference to FIGURES 5 and 7. For take-off, as for normal flight, the intermediate wing member 112 is inoperative and housed within the leading wing member 111.

The operation of the wing in the normal flight position is similar to the normal flight operation of the first aircraft described with reference to FIGURES 1 to 10, and the lift produced in shown in FIGURE 16a at 120.

In landing the flap 16' is lowered (or rather the flaps are lowered, for there is a flap on either side of the fuselage) by pivoting around the shaft 110 through an angle of a little under 90°: the guide vane 119 moves with the flap 16'. At the same time the leading wing member 111 is shifted on its linkage arms 115 to a forward and upward position and the intermediate wing member 112 is moved rearwardly on its track 118 out of the member 111 so that the upper surfaces of such members 111, 112 merge without discontinuity in an upper wing surface extending to a point slightly above the lowered flap 16'.

Figure 1:
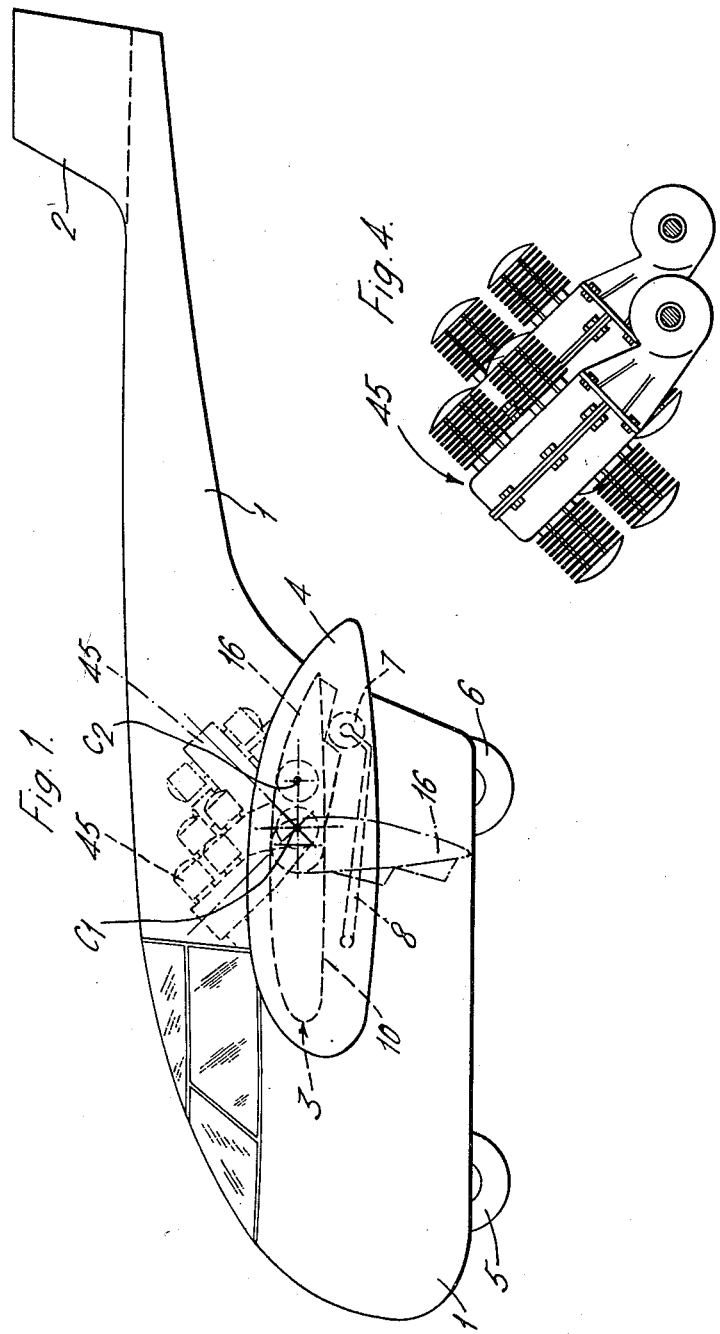
FIGURE 1 is a side elevation of a first preferred form of aircraft, having wings incorporating jet flaps.
Figure 2:
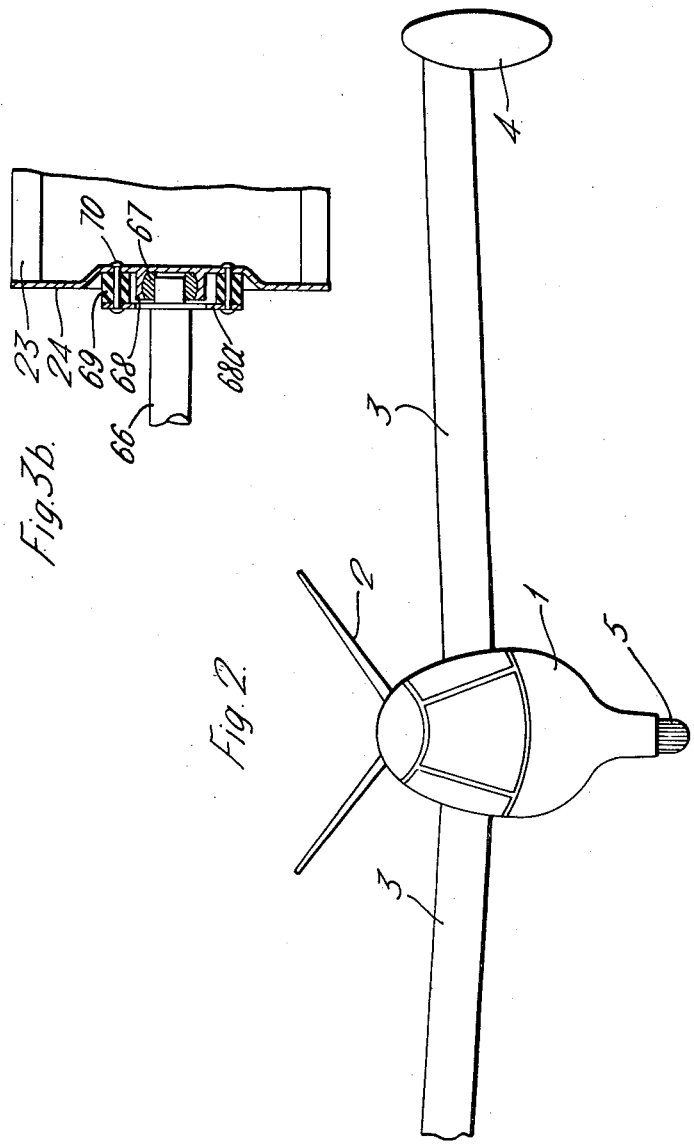
FIGURE 2 is a front elevation of the FIGURE 1 aircraft, with part of one wing omitted.
Figure 3:
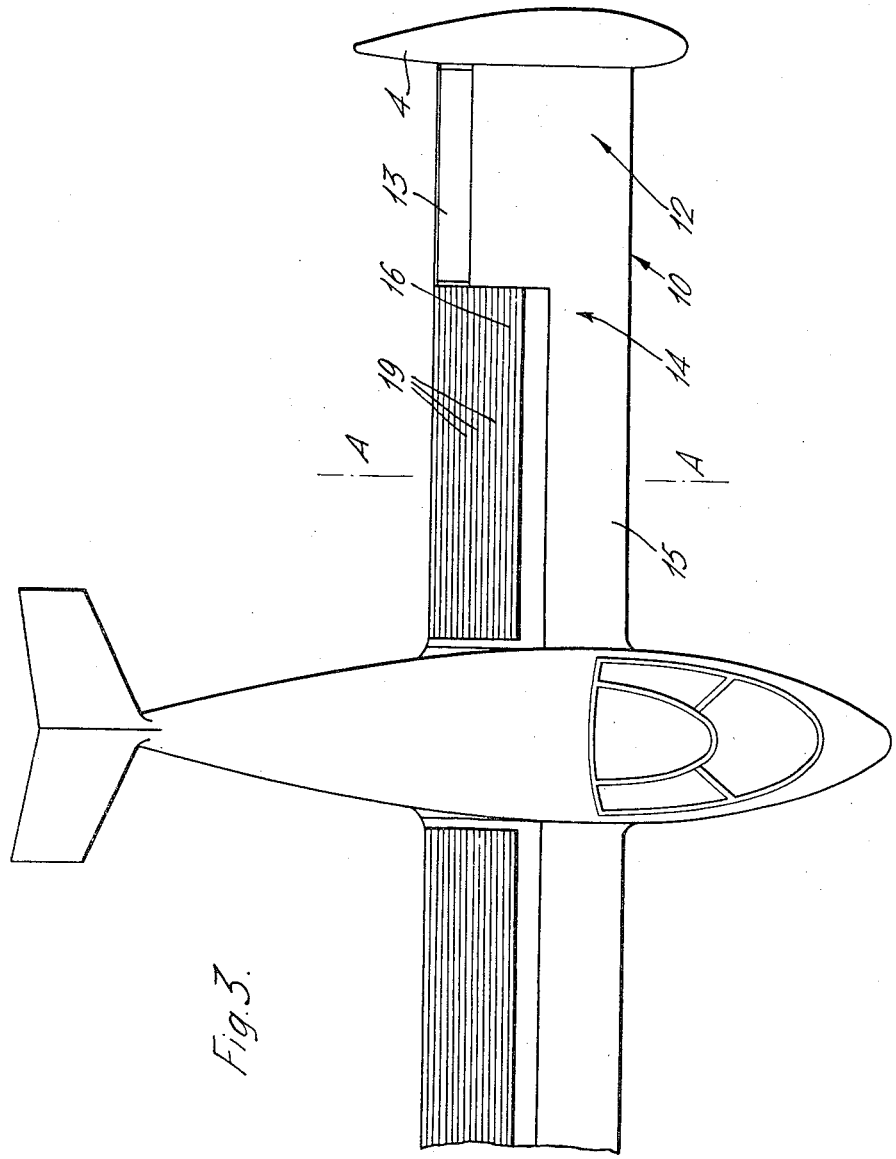
FIGURE 3 is a plan view of the FIGURE 1 aircraft, also with part of one wing omitted.
Figure 9:
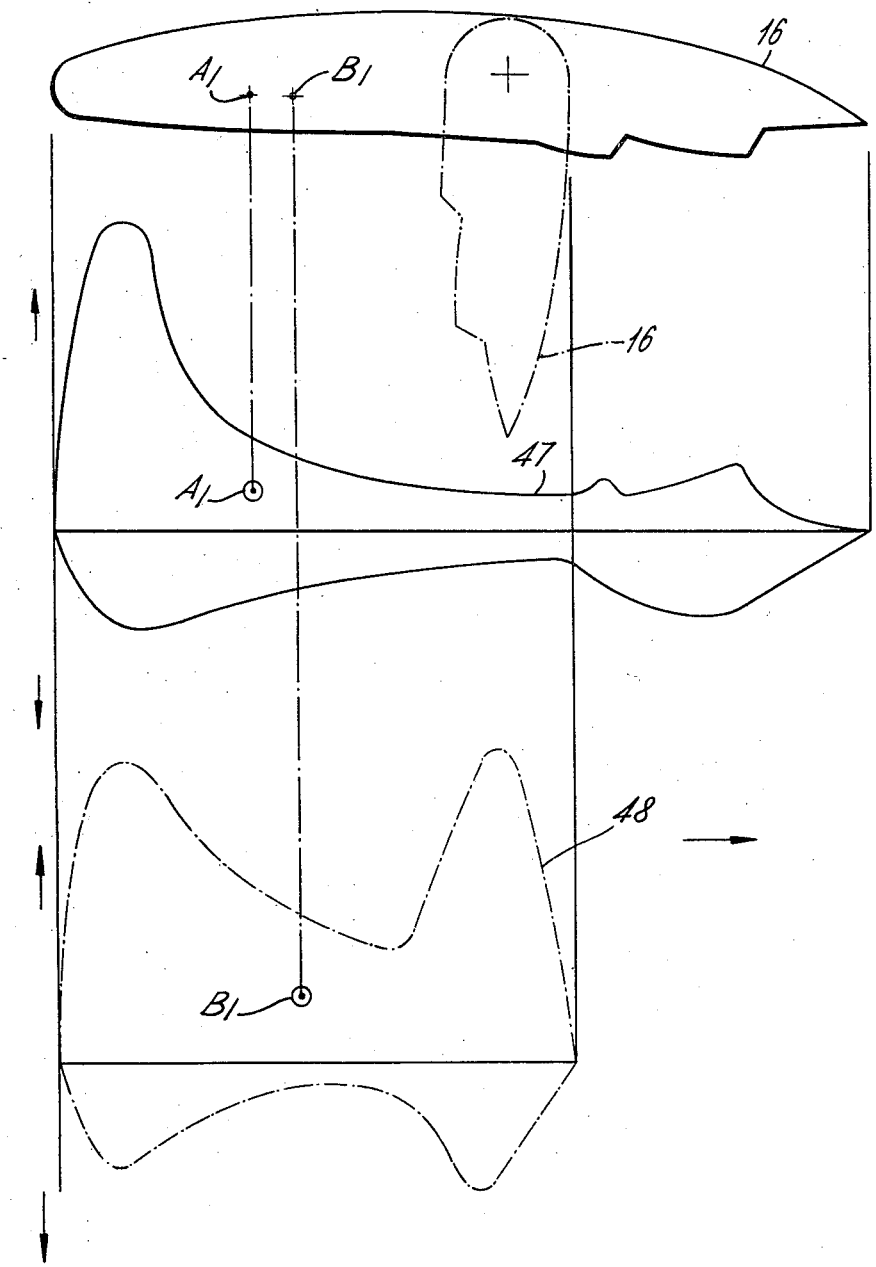
FIGURE 9 is a diagram showing lift on the wing over the chord thereof in the flap positions for normal flight and landing.
Figure 15A:
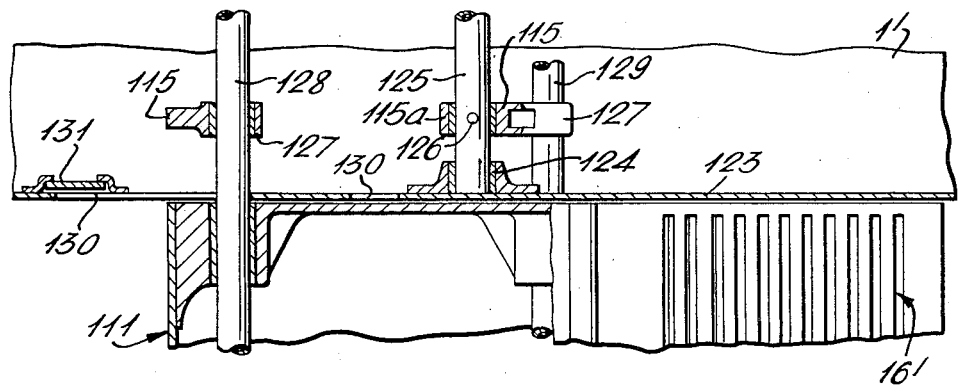
Figure 15B:
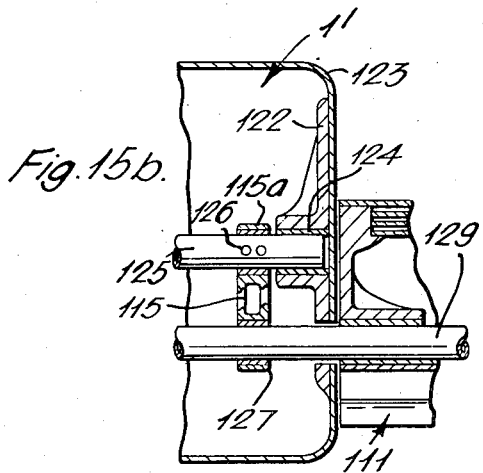

The operation of the flap 16' itself when lowered is similar to that of the flap 16 in FIGURES 1 to 10 in corresponding position: however owing to the interposition of the wing member 112 between the member 111 and the flap, the lift diagram of the arrangement, shown at 121 in FIGURE 16b, is markedly different from the diagram for the corresponding position shown in FIGURE 9. The total chord in the flap-down position is now as long as in the normal flight position of the flap; the forward displacement of the leading wing member 111 by the distance C has caused a corresponding forward displacement of the lift associated with the leading edge of the wing, so that the centre of pressure $D_2$ remains in the same position relative to the fuselage as the centre of pressure $D_1$ in the normal flight position, despite the change of lift distribution produced by lowering the flap.

At this point it may be noted that FIGURE 16a has an upper part showing the normal flight wing profile, and a lower part which is a graph showing pressure distribution over the wing chord in normal flight: FIGURE 16b has an upper part showing the profile of the wing members 111, 112 and flap 16' in their disposition for landing, and a lower part showing pressure distribution over the wing chord at landing. All four parts of FIGURES 16a and 16b are in vertical alignment with one another.

Referring again to FIGURES 14a, 14b, 15a and 15b, it will be seen that the fuselage designated generally 1' includes a stout casting 122 of light alloy arranged at each side, the casting carrying the weight of the wing members 111, 112 and flap 16' and distributing this weight to the stressed skin 123 and other structural parts (not shown) of the fuselage. The castings 122 provide opposed pairs of bearings 124, each pair rotatably mounting between them a shaft 125 extending across the fuselage 1' and providing the previously mentioned pivot 117 for the linkage arms 115 supporting the wing member 111. The arms 115 for the wing member 111 on each side of the fuselage terminate at one end in enlargements 115a received upon the shaft 125 near the corresponding bearing 124 and pinned to the shaft by pins 126. The other ends of the arms 115 are also enlarged and provide bearings 127 in which are journalled large-diameter torque tubes 128, 129 forming the main structural members of both wing members 111. Each torque tube 128, 129 extends the whole length of both wing members 111 and through the fuselage 1', arcuate slots 130 being formed in the fuselage skin 123 to accommodate the torque tubes during movement of the wing members between the positions of FIGURE 14a, and FIGURE 14b. The wing members 111 are thus cantilevered off the fuselage 1' through the arms 115 and move in unison upon application of torque to the shaft 125 by means not shown, for example hydraulic rams of conventional type. A flat arcuate plate 131 moving with the torque tubes 128, 129 slides over each of the slots 130 as they move and closes it.

The leading wing members 111 each include upper and lower walls 132, 133 pivoting wing surfaces, and between them in the interior of the member an intermediate housing portion 134 to receive the intermediate wing member 112 and the track 118 therefor. A spar 135 extending the length of the member 111 (but not, of course, through the fuselage to the other member 111) connects the housing 134 to the lower wall 133 to rigidify the structure. The rear of the wing member 111 between the housing 134 and lower wall 133 is closed by a wall 136 which overlies the forward wall 28' of the flap 16' in the FIGURE 14a position of the wing parts to provide a fair entry of air to the rotor 21' through the opening 137 in the upper wing surface between the rear of the leading member 111 and the flap 16'.

The castings 122 provide bearings (not shown) for the flat-supporting rod 110: a single such rod extends through both flaps so that, like the wing members 111, they too are cantilevered off the fuselage 1'.

The third preferred form of aircraft will now be described with reference to FIGURES 17a, 17b, 18, 19a and 19b. Once again this aircraft shares features with that of FIGURES 1 to 10, which should be referred to for details not specifically shown in FIGURES 17a to 19b, including details of the outboard end structures of the wings.

Turning first to FIGURES 17a, 17b and 18 the aircraft comprises a fuselage designated generally 300 and two wings 301 supported thereon each having a fixed central part 302 built up of front and rear main spars 303, 304, interconnecting transverse frames 305 and longitudinal stringers 306 supporting upper and lower wing skins 307, 308: these skins 307, 308 give the central wing part 302 a conventional profile. Each wing 301 further includes a leading edge portion 309, also of conventional profile, which takes the form of a braced skin pivotally supported on brackets 311 projecting forwardly from the lower edge of the front main spar 303, the pivot pins being shown at 312. An hydraulic cylinder 313 fixed to the front main spar 303 has its ram 314 articulated to the leading edge portion 309 for movement thereof by some 15° or so between the FIGURE 17a position, where it co-operates with the central wing part 302 to form therewith a continuous conventional profile, and the FIGURE 17b position, where the rear upper edge 315 of the leading edge portion defines with the strengthened front edge 316 of the upper wing skin 307 a narrow gap 317 which extends the whole length of the wing part 302. To assist air flow from the interior of the leading edge portion 309 through the gap 317 and to guide it over the outer surface of the upper skin 307, the front edge 316 thereof is gently rounded and the edge 315 of the leading edge portion is interiorly bevelled, as shown at 318.

At the rear of the central wing part 302 there are mounted, one behind the other, a pair of blower units designated generally 320, 321: each unit comprises a casing shown generally at 322, 323 respectively and a bladed drum rotor 324, 325 respectively within the casing. Each casing 322, 323 is supported for angular movement about an axis, designated 326, 327 respectively, which runs longitudinally of the wing and coincides with the axis of rotation of the corresponding rotor 324, 325. Main support for the casings 322, 323 and rotors 324, 325 is provided by bearings at either end thereof. Only the bearings at the fuselage end are shown (somewhat diagrammatically) in FIGURE 18, where they are designated 328, 329 respectively. These bearings are secured to the opposed walls 330, 331 of the fuselage 300, which are suitably strengthened, and while rotor-carrying shafts 332, 333 extend through the bearings, end walls 334, 335 of the casings 322, 323 rotate about their exteriors. The frames 305 extend rearwardly of the central wing part 302, and it is to be understood that one of the frames remote from the fuselage 300 carries, similar bearings for the outer ends of the casings and rotors. Intermediate frames 305 provide secondary support for the casings and rotors in a flexible manner, for example as shown in FIGURES 3a and 3b, the frames dividing the casings and rotors into sections much as shown in FIGURE 3a.

The casing 322, 323 of each blower unit 320, 321 provides a pair of guide walls on either side of the rotor 324, 325: these guide walls are designated respectively 336, 337 and 338, 339, and though the guide walls of one casing are shaped somewhat differently from those of the other both pairs co-operate with the respective rotor in the general manner described with reference to FIGURE 10. Further description of this co-operation will therefore be superfluous: the vortex core and flow tubes are indicated by the same reference letters V, MF, F as used in earlier figures.

The upper skin 307 of the fixed central part 302 of the wing 301 is extended rearwardly over the forward blower unit 320 and there formed with longitudinal vanes 340 of airfoil cross-section which define intake slots 341 diverging in the direction of air flow towards the rotor 324. The rear blower unit 321 has a portion of its casing 323 in the form of longitudinal vanes 342, also of air foil cross-section and defining intake slots diverging in the direction of air flow, these slots being designated 343. The vanes 342 extend over a region on the intake side of the rotor 325 and extending from the guide wall 338 to a longitudinal casing member 344 spaced from the rotor and from the guide wall 339.

A guide vale 345 extending the length of the blower units 320, 321 is supported on arms 346 for pivotal movement between a retracted position shown in FIGURE 17a and an operative position, illustrated in FIGURE 17b.

As so far described, the aircraft of FIGURES 17a, 17b and 18 operates as follows. In normal flight the wing parts have the arrangement of FIGURE 17a. The leading edge portion 309 and central part 302 of the wing 301, back to the forward vane 340, function as one in conventional manner. The blower units 320, 321 fit together so that the vanes 340, 342 form a continuation of the upper wing surface, while the casing walls 337, 339 of the blower units combine to form a continuation of the lower wing surface, the casing walls 336, 339 fitting snugly together. The blower units 320, 321 receive air through the slots 341, 343 which act as diffusers to reduce the speed of flow on the intake side of the rotors 324, 326 (this intake side being designated 347 in FIGURE 17a). The blower units 320, 321 eject air rearwardly through the outlets 348, 349 defined by their guide walls 336, 337 and 338, 339. Despite certain differences of shape and position, the operation of the wing parts in their FIGURE 17a disposition corresponds broadly with that of the wing illustrated in FIGURE 7. The propulsion of the aircraft is effected by the rearward discharge of air and lift by the effect of the wing profile on flow thereover: boundary layer control and increased lift is obtained by the intake of air through the slots 341, 343.

For landing, the blower units 320, 321 are rotated to the positions shown in FIGURE 17b (as by conventional hydraulic rams), and the hydraulic cylinder 313 is actuated to open the gap 317; the guide vane 345 is shifted to its operative position.

In its FIGURE 17b position the blower unit 321 acts as a lowered flap, this effect being accentuated by the jet flap effect due to the downward discharge of air from the outlet 349. Air is taken in to the unit 321 partly through the upwardly directed opening 350 between the guide wall 339 and casing member 344, and partly through the slots 343. The guide vane 345 helps air flow downwardly about the casing member 344, where the wing profile has an abrupt corner. The front blower unit 320 now discharges forwardly into ducts 351 which carry the air to the interior of the leading edge portion 309 of the wing whence it is ejected through the gap 317 over the upper wing surface so as somewhat to increase the lift thereof. The ducts 351 receive only fast flow tubes MF from the unit 320, the remaining flow tubes recirculating to the inlet of the rotor 324. The ducts 351 extend through the front and rear main spars 303, 304 and enlarge in cross-section going in the direction of flow (see both FIGURES 17a, 17b and FIGURE 18) so as to reduce the speed of flow and increase the pressure in the interior of the wing leading edge portion. There is one duct 351 between each pair of adjacent frames 305, its inlet and outlet ends both extending the greater part of the distance between frames.

Turning now to FIGURES 19a and 19b it is first to be noted that, like FIGURES 16a and 16b, each has two parts. The upper part of FIGURE 19a shows the normal flight wing profile and the lower part shows the corresponding distribution of pressure over the wing chord; similarly FIGURE 19b shows the wing profile in its disposition for landing, and the corresponding pressure diagram. All four parts of FIGURES 19a and 19b are vertically aligned on the paper. It will be seen that the FIGURE 19a profile and pressure diagram (designated 355) are more or less conventional. The pressure diagram 356 of FIGURE 19b shows the effect of moving the leading edge portion 309 to open the gap 317, and of rotating the blower units 320, 321 so that the former ejects air from the gap and the latter blows downwards. The ejection of air from the gap 317 over the upper wing surface increases the lift thereon as shown at 356a; lift on the under surface is also increased as shown at 356b. The blower unit 321 causes a large increase of lift towards the trailing edge of the wing, as shown at 356c. The increased lift forwards is made to balance the increased lift aft so that the centre of pressure remains in the same line 357 as that of the wing as disposed for normal flight.

Returning now to FIGURE 18, the rotors 324, 325 of the blower units 320, 321 are driven by a pair of independent similar gasoline engines 360, 361 of the high-speed light-weight 2-stroke type and having their cylinders in line. The engines 360, 361 are fixed in the fuselage 300 with their crankshafts (not shown) parallel and disposed across the fuselage centre line. The engine 360 has each end of its crankshaft directly connected to the previously-mentioned rotor drive shafts 332 for the rotors 324 on either side of the fuselage. Similarly, the engine 361 has its crankshaft directly connected to the shafts 333 driving rotors 325 on either side of the fuselage. Thus failure of one engine still leaves a symmetrical propulsion system operating.

The engines 360, 361 are both air cooled. Each has a bladed drum rotor 362 mounted for rotation about an axis parallel to that of the engine crankshaft and driven therefrom by belting (not shown). Each rotor 362 is disposed alongside the bank of cylinders and co-operates with guide walls (not shown) in the general manner described with reference to FIGURE 10 whereby in operation to direct a stream of cooling air against the cylinders over the whole length of the bank. The air for the engine-cooling rotors 362 is taken from slits 363 disposed in the fuselage to the rear of the passenger cabin (not shown), through ducting. Only the ducting 364 for one rotor 362 is shown in FIGURE 18, and it will be seen that this communicates with only half the slits 363; the remaining slits are connected to the other rotor 362 by ducting (not shown). Cooling air is ejected from both rotors to slits 365 disposed where the fuselage 300 begins to taper: once again only the ducting 366 for one rotor 362 is shown and it will be understood that the other such rotor is similarly provided.

The slits 363 are arranged to improve air flow over the fuselage by boundary layer suction in the region behind the passenger cabin, which region is usually troublesome as regards air flow. The slits 365 are arranged for ejection of air over the tapering part of the fuselage whereby again to provide boundary layer control in a region where flow difficulties are commonly encountered. The air flow through the slits 363, 365 accordingly reduces drag on the aircraft.

Alternatively to the rotor drive arrangement shown in FIGURE 18, a pair of similar small gas turbines could be used to power the blower units 320, 321.

It is contemplated that instead of ejecting engine-cooling air through slits 365, the cooling air from rotors 362 and the exhaust from the motors 360, 361 could be used to provide a blowing system for the elevators (similar to a blown flap system) or to provide hot air for de-icing.

FIGURES 20a and 20b show further modifications of the aircraft of FIGURES 1 to 10 which are concerned with the drive of the rotors. In each figure fuselage, tank units, tail unit and wing portions are given the same numerals as in FIGURES 1 to 10. In each figure a portion of the upper skin of one wing is removed to show the spars and ribs thereof.

FIGURE 20a shows a pair of flaps 16a on either side of the fuselage which are to be assumed similar in essentials to the flaps 16 of the earlier figures, with the exception that the rotors are driven not by engines in the fuselage but by engines in nacelles 138 part-way along each wing. This arrangement will sometimes be preferred for reasons of weight distribution and mechanical convenience.

FIGURE 20b shows on either side of fuselage 1 a series of short flaps 16a each independently driven by an associated motor 139 but movable together. The motors may be small gas turbines or rotary piston engines (e.g. the so-called "Wankle" engine), and the rotors (not shown), being short, may be simply overhung on the motor shafts. The multiplicity of motor tends to enhance the safety of the aircraft.

In both the arrangements of FIGURES 20a and 20b it is to be assumed that the engines move with the flaps to change the weight distribution to accord with the changed lift distribution.

FIGURE 21a illustrates a wing having a modified and somewhat simpler flap system than that of FIGURES 1 to 10, and one which has features in common with the flap system of FIGURES 17a, 17b and 18. The major part (designated 140) of the wing section going from the leading edge is of conventional profile, but at the trailing edge a rear closure wall 141 merging smoothly with the lower surface of the wing leads up in an inflected curve to join the upper surface at an edge. A flap 142 is mounted behind and in spaced relation to the rear wall 141 and is pivotable about an axis 143 fixed with respect to the wing between the full line and chain dotted positions illustrated. The flap 142 is provided over its whole length with a rotor 144 also rotatable about the axis 143, and co-operating with guide walls 145, 146; the rotor and guide walls are similar to the rotor 21 and guide walls 27, 28 described above and co-operate in the manner described with reference to FIGURE 10 to induce a flow of air as shown by the chain dotted lines F, MF having the same significance as in that figure. It will be remembered that the flow line MF has greater velocity than the flow lines F: in the FIGURE 21a arrangement the flow

UNITED STATES PATENT OFFICE
CERTIFICATE OF CORRECTION

Patent No. 3,159,362            December 1, 1964

Nikolaus Laing

It is hereby certified that error appears in the above numbered patent requiring correction and that the said Letters Patent should read as corrected below.

Column 7, line 43, for "by prestressed plain fibre." read -- shifting the power unit. --; line 44, for "16"" read -- 16' --.

Signed and sealed this 9th day of February 1965.

(SEAL)
Attest:

ERNEST W. SWIDER            EDWARD J. BRENNER
Attesting Officer            Commissioner of Patents rotor axis; power means to drive the rotors; means to pivot the blower units between a normal flight position where they suck air from over the upper surface of the main wing portion and eject it rearwardly, and a landing position where the blower units eject air generally downwardly, and means increasing lift adjacent the leading edges of the main wing portions when the blower units are shifted to their landing position.

7. An aircraft as claimed in claim 6, wherein said lift-increasing means includes means supplying air to the interior of the main wing portion, and means providing a closable gap adjacent the leading edge of said main wing portion and extending longitudinally in the upper surface thereof, for ejection of air over said upper wing surface.

8. An aircraft as claimed in claim 6, wherein said lift-increasing means includes means supplying air to the interior of the main wing portion, said main wing portion having a fixed central part and a leading edge part articulated to the central part near the lower wing surface for angular movement of the leading edge part to provide a longitudinal gap between said parts at the upper wing surface through which gap air is ejected from said interior over the upper wing surface.

9. An aircraft comprising: a fuselage; a pair of wings extending substantially transversely of the fuselage with each wing including a main portion and first and second blower units extending longitudinally of the wing and arranged one behind the other rearwardly of the main wing portion; each blower unit comprising a bladed drum rotor extending longitudinally and mounted for rotation about its axis, and a pair of guide walls disposed about the rotor and defining an outlet therefrom, the guide walls co-operating with the rotor on rotation thereof to induce a flow of air twice through the path of the rotating blades and out through the outlet in a direction transverse to the rotor axis; power means to drive the rotors of the first blower units and the rotors of the second blower units; means providing a closable gap adjacent the leading edge of said main wing portion and extending longitudinally in the upper surface thereof; means to pivot the blower units between a normal flight position where they suck air from over the upper surface of the main wing portion and eject it rearwardly and a landing position of the blower units wherein the first said units blow air into the interior of the main wing portion for ejection through said gap and the second said units blow air generally downwardly.

10. An aircraft as claimed in claim 9, wherein the axes of the first blower units and the rotors thereof coincide, and wherein the axes of the second blower units and their rotors coincide, and wherein the rotors of the first blower units are driven directly by a first power unit in the fuselage and wherein the rotors of the second blower units are driven directly by a second power unit separate from and independent of the first power unit.

11. An aircraft as claimed in claim 10, wherein said power units are air-cooled, and cooling air is supplied thereto and ejected therefrom through slits in the fuselage, whereby to provide boundary layer control thereto.

12. An aircraft comprising a fuselage and a pair of wings extending transversely of the fuselage; each said wing including a fixed portion and a flap angularly movable about a pivot axis running longitudinally of the wing at the trailing edge of the fixed portion; each flap comprising a casing and at least one cylindrical bladed rotor therewithin extending substantially the length of the casing and mounted for rotation about an axis parallel to said flap axis, the casing providing guide walls to guide air twice through the path of the rotating blades of the rotor and an air inlet and an air outlet, both inlet and outlet extending substantially the length of the flap; power source means driving the rotors; and means mutually adjusting the center of gravity of the aircraft and the center of pressure on angular movement of the flaps; said power source means being pivotally mounted within the fuselage for pivoting movement in synchronism with the flaps to provide said center of gravity adjusting means.

13. An aircraft comprising a fuselage and a pair of wings extending transversely of the fuselage; each said wing including a fixed portion and a flap angularly movable about a pivot axis running longitudinally of the wing at the trailing edge of the fixed portion; each flap comprising a casing and at least one cylindrical bladed rotor therewithin extending substantially the length of the casing and mounted for rotation about an axis parallel to said flap axis, the casing providing guide walls to guide air twice through the path of the rotating blades of the rotor and an air inlet and an air outlet, both inlet and outlet extending substantially the length of the flap; power source means driving the rotors; and means mutually adjusting the center of gravity of the aircraft and the center of pressure on angular movement of the flaps; said flaps each including two parallel unconnected rotors, and the power source means including two independent engines each driving one rotor of each flap, said flaps and engines being pivotally mounted as a unit to provide the center of gravity adjusting means.

14. An aircraft comprising a fuselage and a pair of wings extending transversely of the fuselage; each said wing including a fixed portion and a flap angularly movable about a pivot axis running longitudinally of the wing at the trailing edge of the fixed portion; each flap comprising a casing and at least one cylindrical bladed rotor therewithin extending substantially the length of the casing and mounted for rotation about an axis parallel to said flap axis, the casing providing guide walls to guide air twice through the path of the rotating blades of the rotor and an air inlet and an air outlet, both inlet and outlet extending substantially the length of the flap; power source means driving the rotors; means mutually adjusting the center of gravity of the aircraft and the center of pressure on angular movement of the flaps; and a second fixed wing portion in tandem with each first-mentioned fixed wing portion; the flap of each wing in an upper position ejecting air substantially horizontally over its associated second fixed wing portion to increase the lift thereof and in a lower position ejecting air downwardly clear of its associated second fixed wing portion.

References Cited in the file of this patent

FOREIGN PATENTS 581,242   Italy _____ Aug. 23, 1958

UNITED STATES PATENT OFFICE
CERTIFICATE OF CORRECTION

Patent No. 3,159,362                   December 1, 1964

Nikolaus Laing

It is hereby certified that error appears in the above numbered patent requiring correction and that the said Letters Patent should read as corrected below.

Column 7, line 43, for "by prestressed plain fibre." read -- shifting the power unit. --; line 44, for "16"" read -- 16' --.

Signed and sealed this 9th day of February 1965.

(SEAL)
Attest:

ERNEST W. SWIDER                           EDWARD J. BRENNER
Attesting Officer                               Commissioner of Patents